United States Patent
Benveniste et al.

(10) Patent No.: US 7,289,803 B1
(45) Date of Patent: Oct. 30, 2007

(54) METHOD FOR UPLINK SPECTRUM MONITORING FOR SPARSE OVERLAY TDMA SYSTEMS

(75) Inventors: Mathilde Benveniste, South Orange, NJ (US); Sushil Kumar Prabhu, Ocean, NJ (US)

(73) Assignee: AT&T Corp., New York, NY (US)

( * ) Notice: Subject to any disclaimer, the term of this patent is extended or adjusted under 35 U.S.C. 154(b) by 277 days.

(21) Appl. No.: 10/913,546

(22) Filed: Aug. 9, 2004

Related U.S. Application Data

(63) Continuation of application No. 09/947,367, filed on Sep. 7, 2001, now Pat. No. 6,792,268.

(51) Int. Cl.
*H04Q 7/20* (2006.01)

(52) U.S. Cl. .................. 455/423; 455/444; 455/454

(58) Field of Classification Search ............... 455/423, 455/454, 444
See application file for complete search history.

(56) References Cited

U.S. PATENT DOCUMENTS

| | | | |
|---|---|---|---|
| 5,404,574 A | 4/1995 | Benveniste | |
| 5,787,352 A | 7/1998 | Benveniste | |
| 5,809,423 A | 9/1998 | Benveniste | |
| 5,903,840 A * | 5/1999 | Bertacchi | 455/436 |
| 6,792,268 B1 * | 9/2004 | Benveniste et al. | 455/423 |

OTHER PUBLICATIONS

Katzela et al., "Channel Assignment Schemes for Cellular Mobile Telecommunications Systems: A Comprehensive Survey," IEEEE Personal Communications, Jun. 1996; pp. 10-31.

P. Fitzpatrick et al., "Frequency Reuse in Coexisting Microcells and Macrocells," The Institution of Engineers Australia Communications Conference, Sydney, Oct. 20-22, 1992; pp. 219-223.

Almgren et al., "Channel Allocation and Power Settings in a Cellular System with Macro and Micro Cells Using the Same Frequency Spectrum," 1996 IEEE 46th Vehicular Technology Conference, pp. 1150-1154, no month listed.

(Continued)

*Primary Examiner*—Lester G. Kincaid
*Assistant Examiner*—Shantell Portis

(57) ABSTRACT

Spectrum monitoring measurements are made by microcell base stations in a layered cellular network, while not serving calls or engaged in processing calls. The microcell base station transmits a first control message from to a microcell mobile station, to increase the duration for the mobile station to reside in the camping state on a control channel of the microcell base station. The microcell base station transmits a second control message from the microcell base station to the microcell mobile station, to increase the duration for the mobile station to reside in a call origination state while attempting to access a control channel of the microcell base station. Then, to perform the spectrum monitoring measurement, the base station's transmitter is turned off, the receiver is retuned to the frequency to be monitored, a signal strength measurement taken on that frequency, the receiver is retuned back to its assigned frequency, and the transmitter is turned back on, all in a short time interval. Because the measurement time is so short, it is possible to take spectrum-monitoring measurements without causing inactive mobiles registered on the measuring base station to reselect control channel. Mobiles initiating a call during a spectrum monitoring measurement by its base station are also delayed in their control channel reselection.

33 Claims, 11 Drawing Sheets

OTHER PUBLICATIONS

Kinoshita et al., "High Density Space Division Multiple Access: Double Reuse of Frequency Channels," 1994 Third Annual Int'l Conference on Universal Personal Communications ; Sep. 27-Oct. 1, 1994; San Diego, California; pp. 552-557.

* cited by examiner

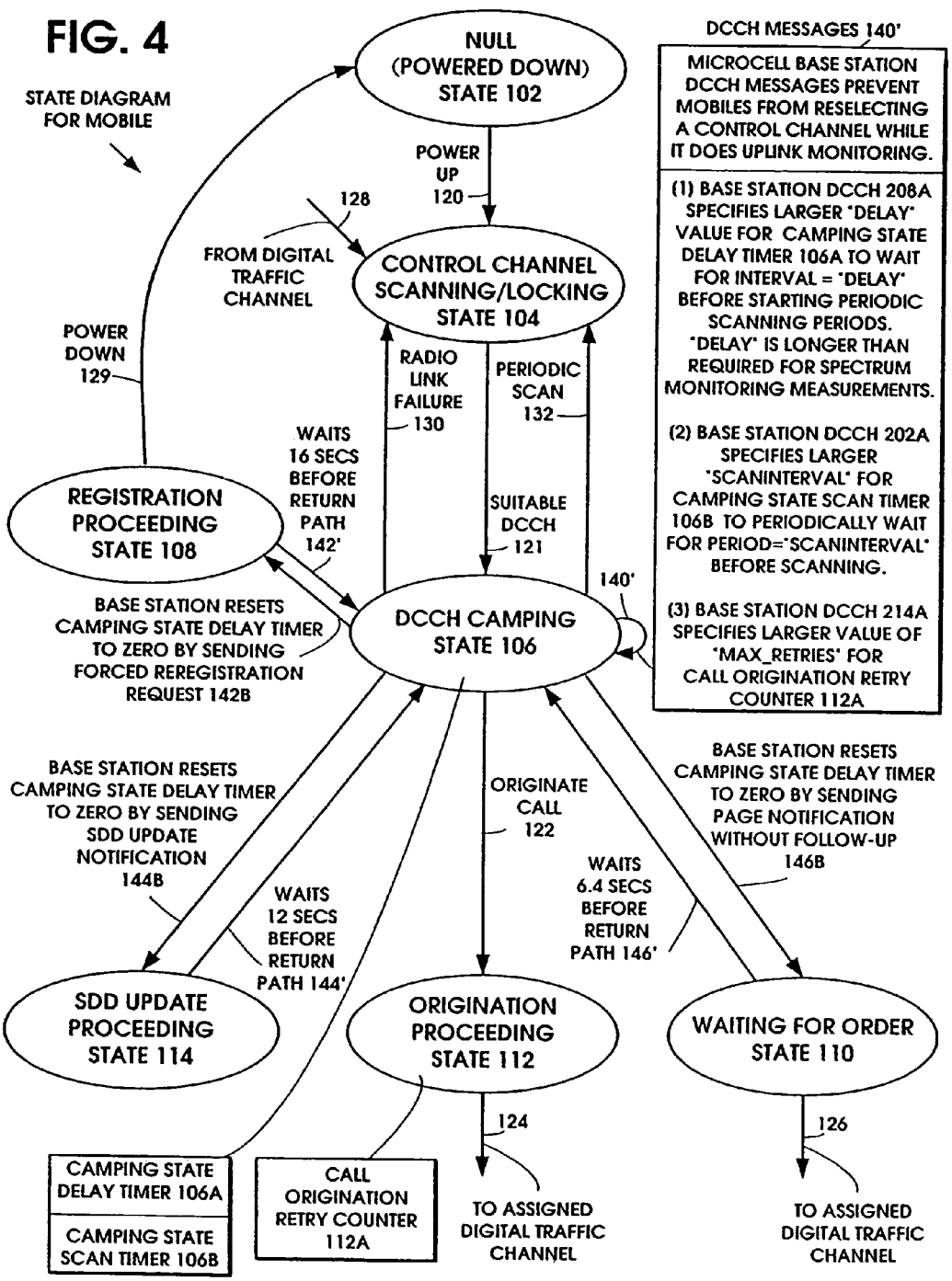

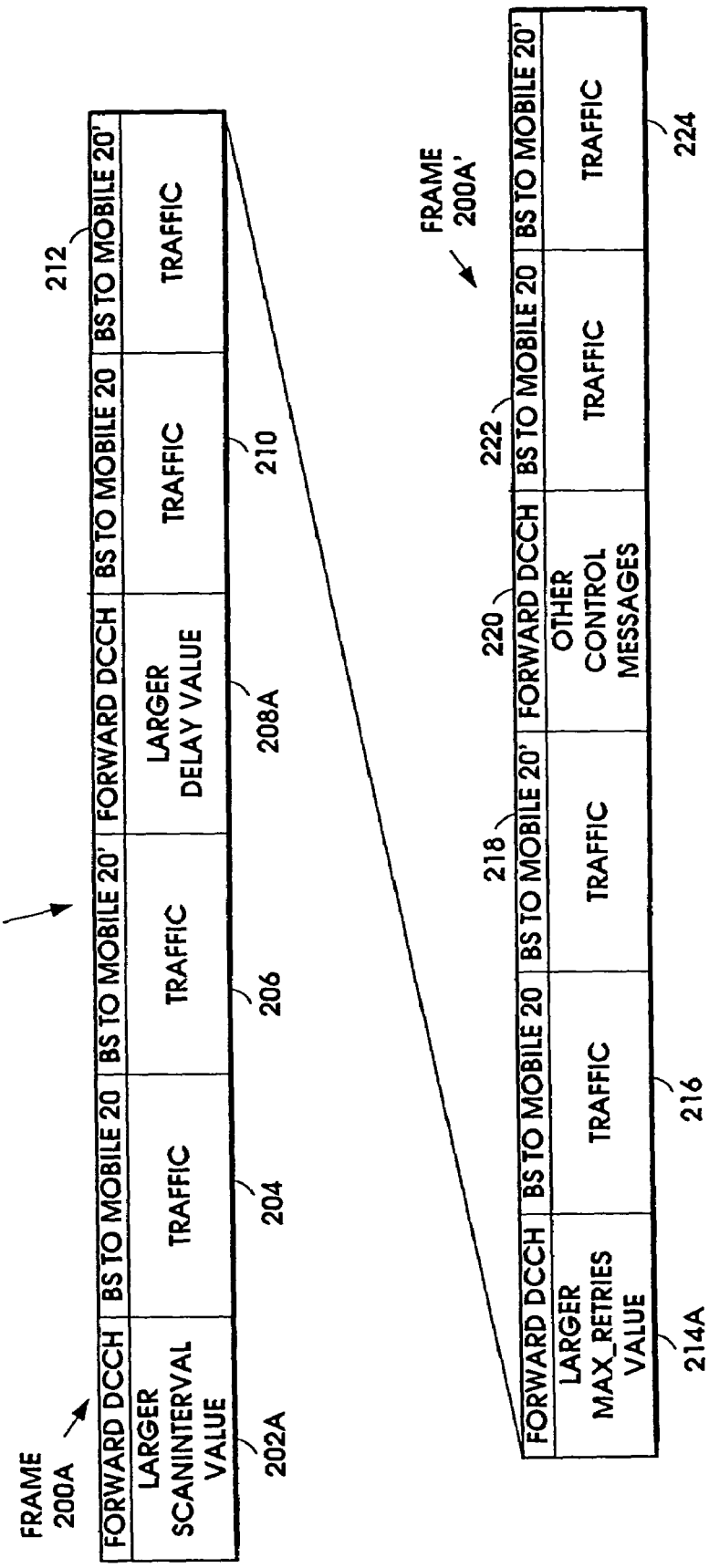

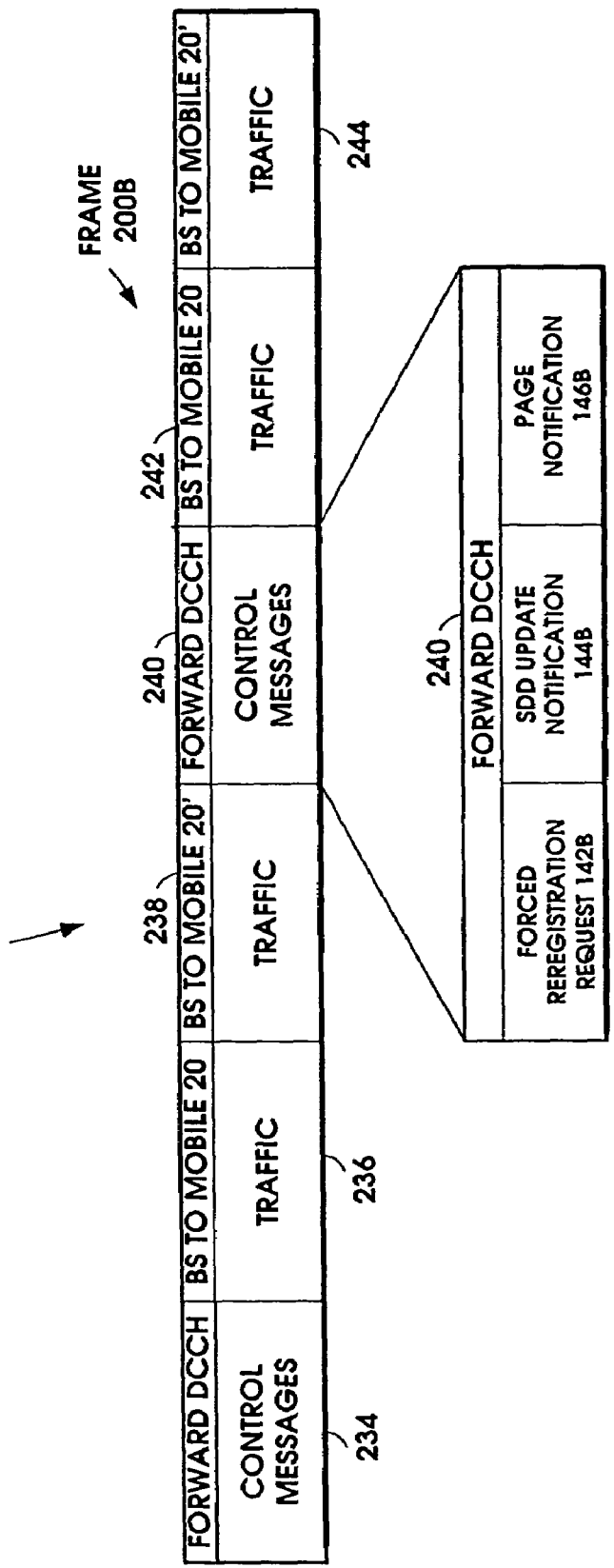
FIG. 5B    IS-136 FRAME CARRYING FORWARD DIGITAL CONTROL CHANNEL (DCCH) CONTAINING CONTROL MESSAGES TO RESET CAMPING STATE DELAY TIMER TO ZERO

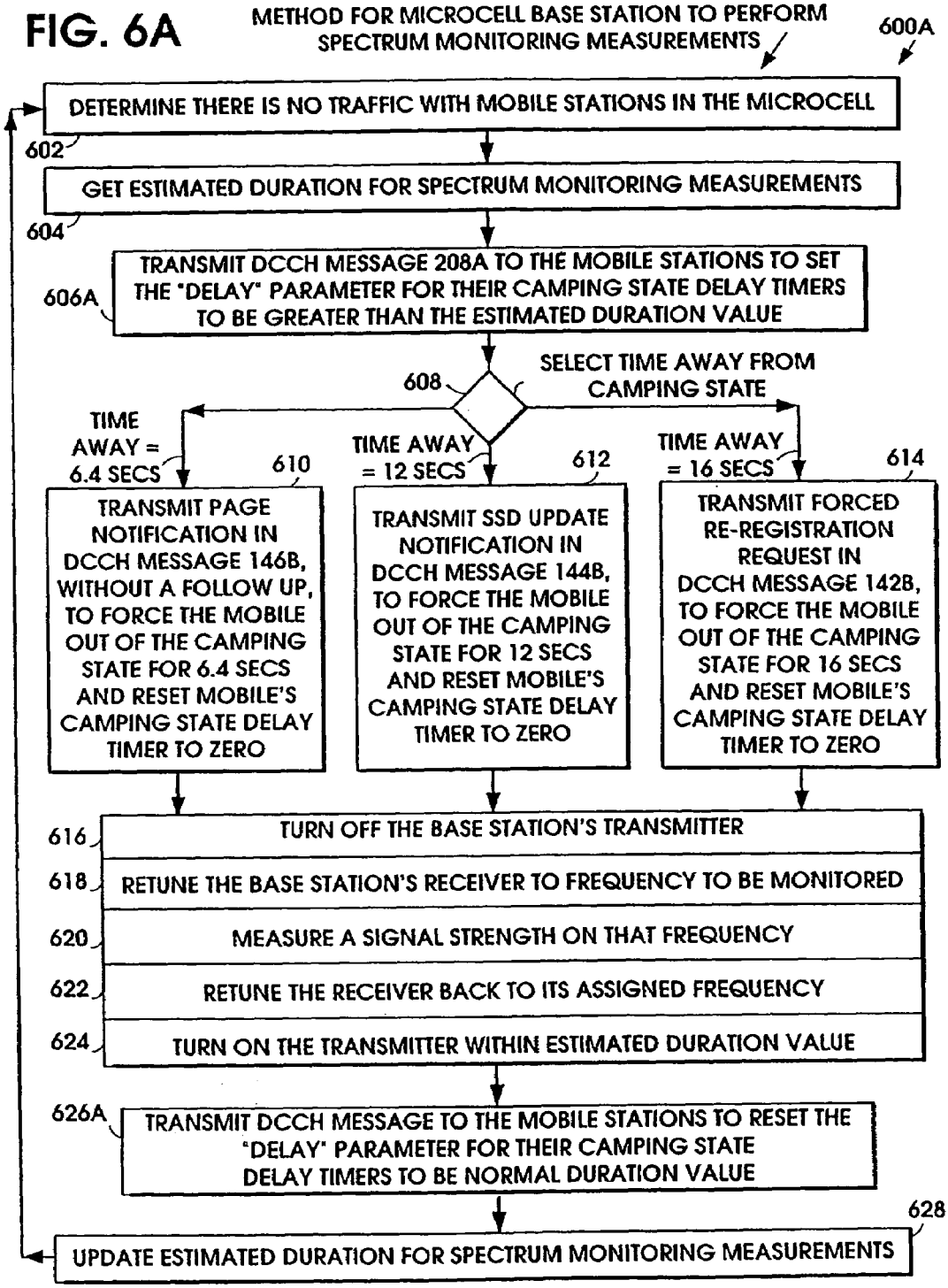

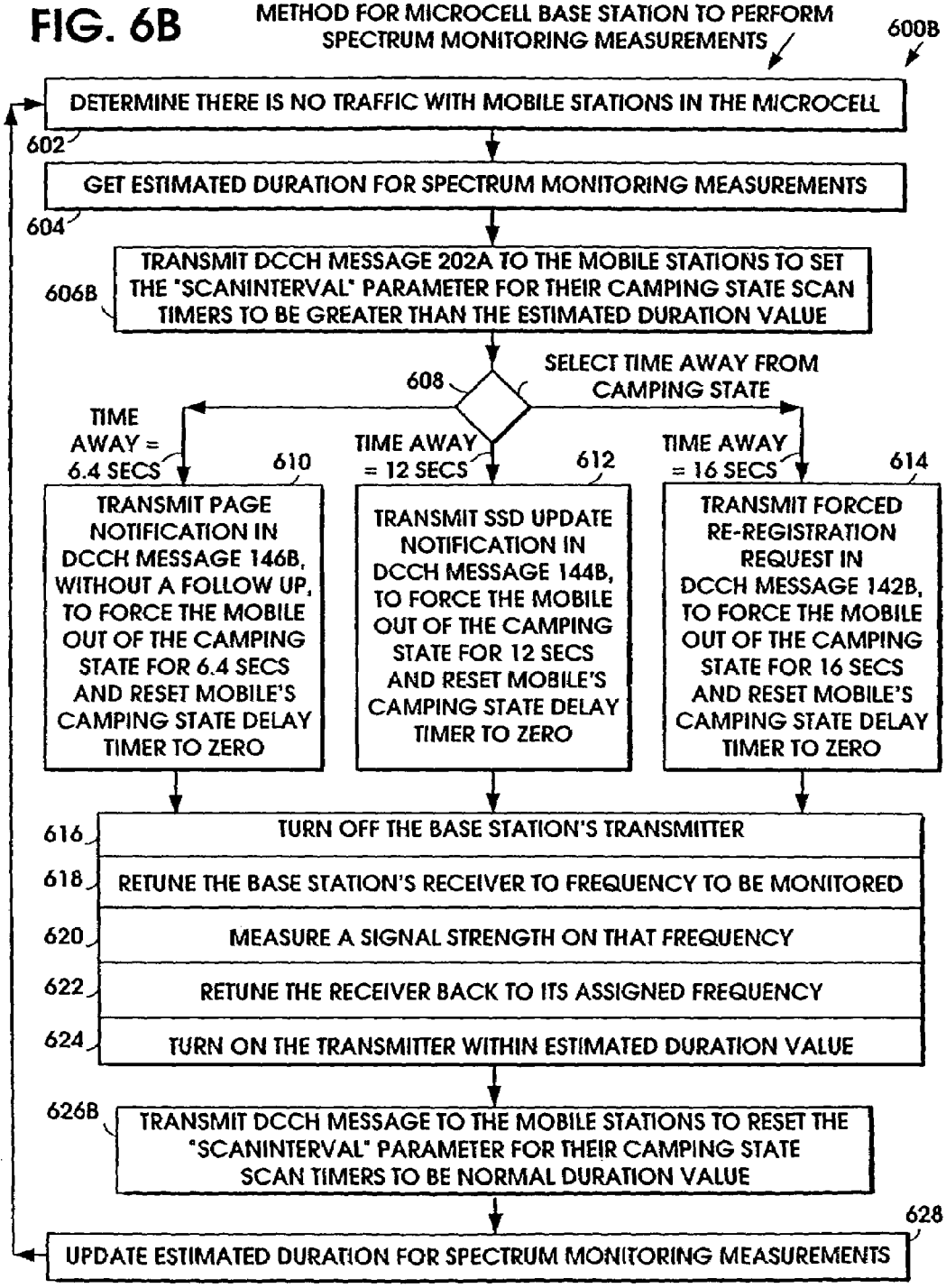

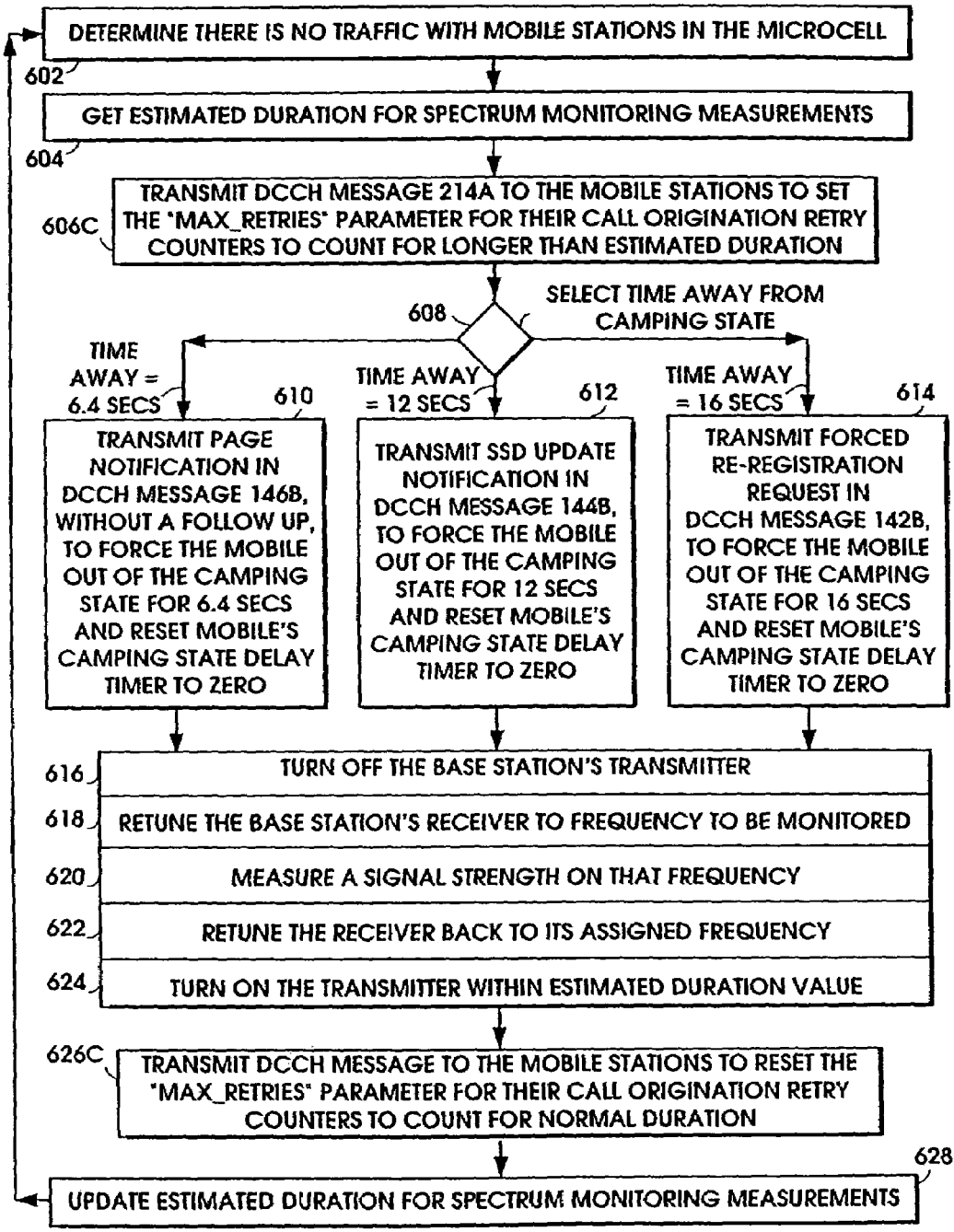

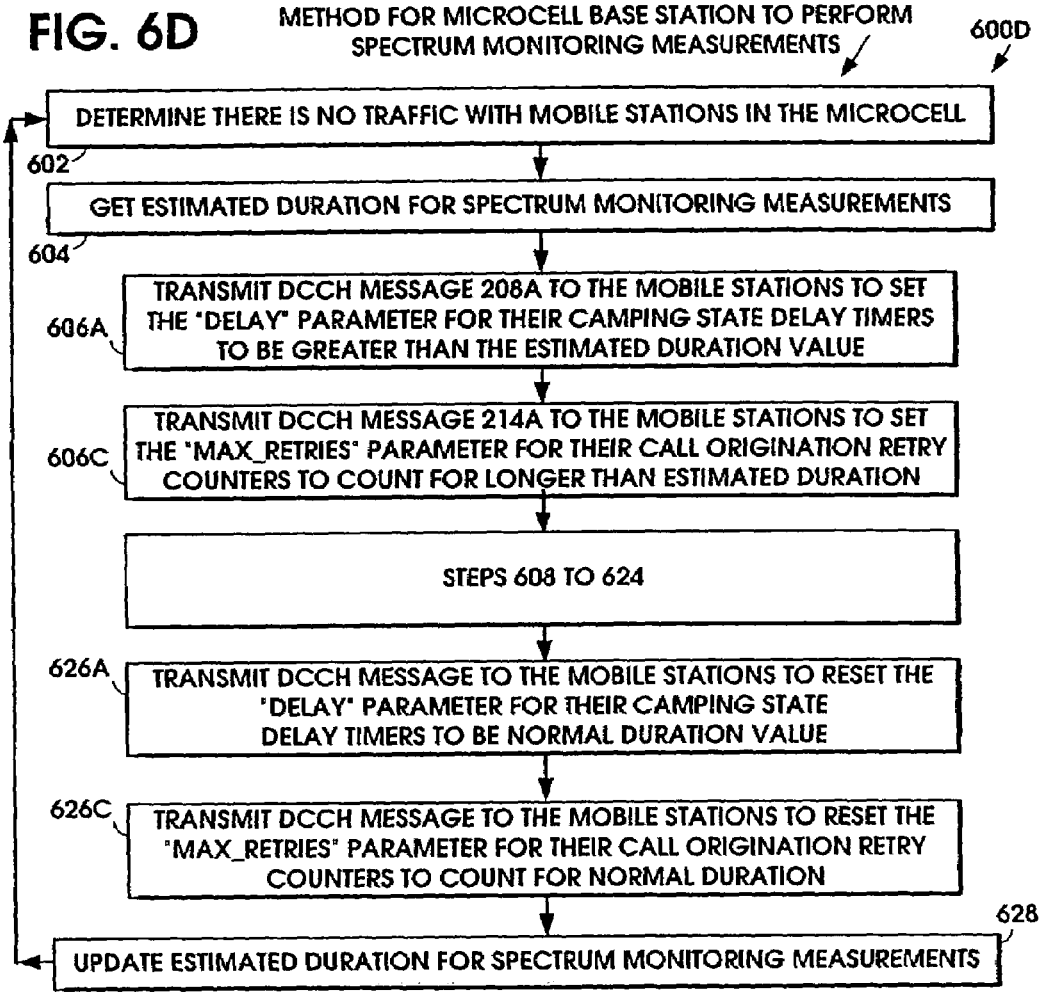

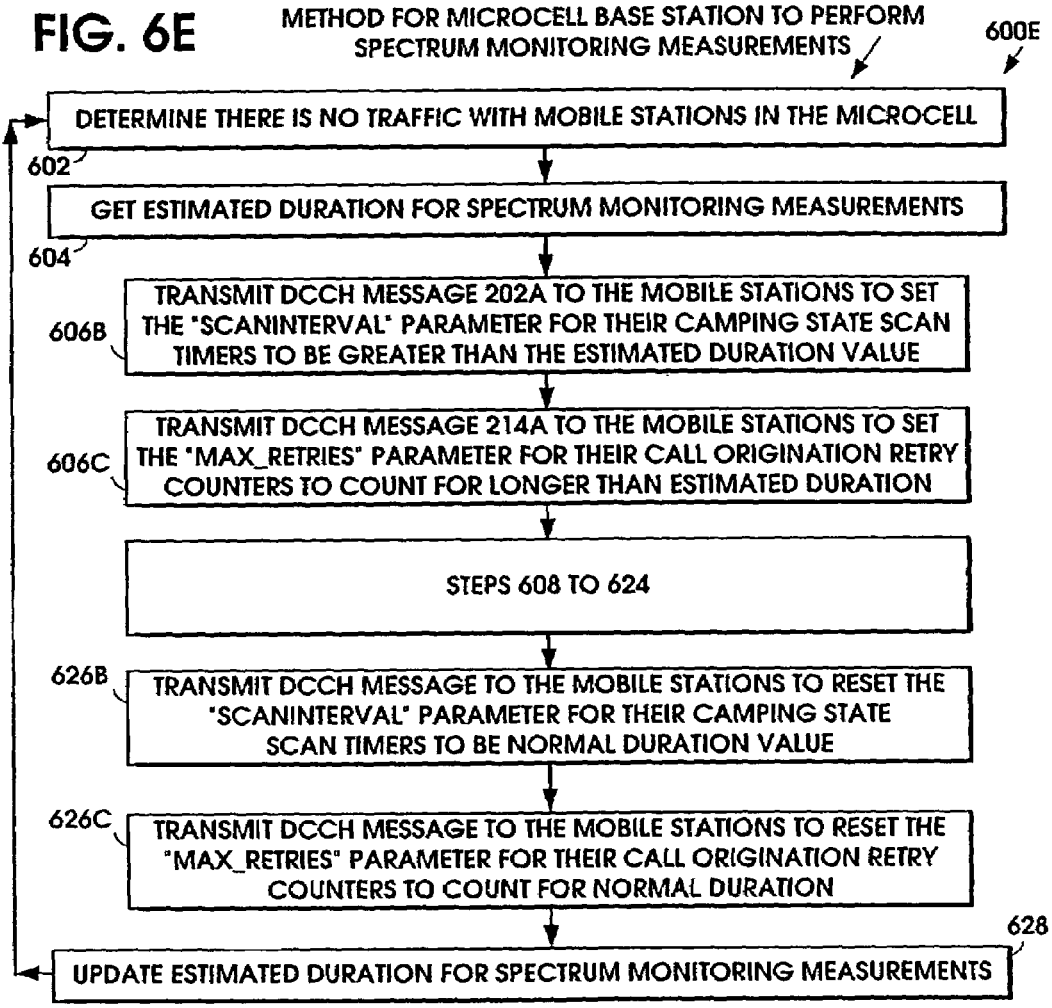

METHOD FOR UPLINK SPECTRUM MONITORING FOR SPARSE OVERLAY TDMA SYSTEMS

This is a continuation of prior application Ser. No. 09/947,367, filed Sep. 7, 2001 now U.S. Pat. No. 6,792,268, to which priority under 35 U.S.C. § 120 is claimed.

BACKGROUND OF THE INVENTION

1. Field of the Invention

The invention disclosed broadly relates to wireless communications and more particularly relates to RF spectrum monitoring for wireless systems.

2. Related Art

The invention disclosed is related to U.S. Pat. No. 6,615,040 to Mathilde Benveniste, issued Sep. 2, 2003, entitled "Self-Configurable Wireless Systems: Spectrum Monitoring In A Layered Configuration", assigned to the AT&T Corporation, and incorporated herein by reference.

The invention disclosed is also related to U.S. Pat. No. 5,404,574 to Mathilde Benveniste, issued Apr. 4, 1995, entitled "Apparatus And Method For Non-Regular Channel Assignment In Wireless Communication Systems", assigned to the AT&T Corporation, and incorporated herein by reference.

The invention disclosed is also related to U.S. Pat. No. 5,809,423 to Mathilde Benveniste, issued Sep. 15, 1998, entitled "Adaptive-Dynamic Channel Assignment Organization System And Method", assigned to Lucent Technologies, Inc., and incorporated herein by reference.

The invention disclosed is also related to U.S. Pat. No. 5,787,352 to Mathilde Benveniste, issued Jul. 28, 1998, entitled "System and method for management of neighbor-channel interference with power control and directed channel assignment", assigned to the AT&T Corporation, and incorporated herein by reference.

3. Background

The IS-136 Digital Cellular/PCS Standard

An IS-136 Digital Cellular/PCS system includes one or more cellular radio telephones or mobile devices within the communications range of a base station. The base station can have one or more radio transceivers, a control computer, and an antenna system. The base station is connected by means of a mobile switching center (MSC) to the public switched telephone network (PSTN). The mobile switching center provides the functionality of a telephone central office and is additionally responsible for call processing, mobility management, and radio resource management. The IS-136 Digital Cellular/PCS network architecture and system operation are specified by the *Telecommunications Industry Association, TIA/EIA Interim Standard: TDMA Cellular/PCS-Radio Interface—Mobile Station-Base Station Compatibility, Revision A, TIA/EIA/IS-136-A*, October 1996.

FIG. 1 shows the prior art state diagram of an IS-136 compliant mobile device. A mobile's operation is carried out in processes that occur when it transitions from one state to another. The processes are carried out by software in the mobile. State 102 is the null state when the mobile is powered down. Upon being powered up by the power up action path 120, the mobile transitions to state 104 which is the Control Channel Scanning and Locking state. A mobile executes the DCCH Scanning and Locking procedure while in this state, attempting to find a digital control channel (DCCH). A mobile executes the Control Channel Selection procedure from the Control Channel Scanning and Locking state 104 once a DCCH is found using the DCCH Scanning and Locking procedure. The Control Channel Selection procedure is executed in order to determine if the DCCH is suitable for camping.

Communication between the mobile device and the base station employs a time division multiple access (TDMA) frame structure shown in FIG. 2, where each frame 200 and 200' has six time slots. Frames 200 and 200' shown in FIG. 1, occur at different frame times in the same 30-kHz RF channel. In the digital PCS full rate mode, each user is allowed access to two of the six time slots in a frame, so one RF channel can simultaneously serve up to three users. The frames have a duration of 40 ms and are organized into superframes of 16 TDMA frames, having a duration of 640 ms. A hyperframe consists of two superframes, and has a duration of 1.28 seconds. Frequency division multiple access (FDMA) is used to support more users by assigning multiple RF channels for use in the same cell. A mobile user transmits in the reverse or uplink direction on one frequency and receives in the forward or downlink direction on a different frequency, using frequency division duplexing (FDD).

Only one forward digital control channel (DCCH) consisting of two time slots 202 and 208 in one RF channel of FIG. 2, is required in the forward or downlink direction from the base station to the mobiles. Similarly, only one reverse digital control channel (DCCH) consisting of two time slots in another RF channel, is required in the reverse or uplink direction from the mobiles to the base station. The logical channels of the DCCH in the forward direction (from the base station to the mobile) are divided into broadcast channels and point-to-point channels, while the reverse DCCH is a point-to-point channel. The frame 200 shown in FIG. 2 carries the forward digital control channel (DCCH) containing control channel selection parameters for SCANINTERVAL in time slot 202 and DELAY VALUE in time slot 208. Time slots 204 and 210 carry traffic from the base station (BS) to mobile 20 and time slots 206 and 212 carry traffic from the base station (BS) to mobile 20'. The frame 200A shown in FIG. 2 carries the forward digital control channel (DCCH) containing the access parameter for MAX_RETRIES in time slot 214. Time slots 216 and 222 carry traffic from the base station (BS) to mobile 20 and time slots 218 and 224 carry traffic from the base station (BS) to mobile 20'. Time slot 220 carries other forward digital control channel (DCCH) broadcast channel messages or point-to-point control channel messages.

Once a suitable digital control channel (DCCH) is found, action path 121 causes the mobile to transition to the DCCH Camping state 106 in FIG. 1. The DCCH Camping state 106 is the normal state for the mobile while in service on a DCCH and not processing a call. Upon entering the DCCH Camping state, a mobile must read control information from the base station contained in the DCCH messages 140. This information includes control channel selection parameters used by the mobile in the reselection of a DCCH, including the SCANINTERVAL parameter and the DELAY parameter. This information also includes access parameters used by the mobile to access the base station, including the MAX_RETRIES parameter. The mobile periodically executes a number of processes and procedures while in the DCCH Camping state 106, including control channel reselection. A mobile remains in the DCCH Camping state 106 while it reselects from one DCCH to another. In the process reselection to select the best DCCH, the mobile periodically measures the received signal strength on the neighboring control channels from base stations in neighboring cells. The mobile then evaluates whether another base station's control channel would be better. If a better control channel is found, the mobile tunes to the new base station's control channel, synchronizes, and begins to monitor it for messages.

While in the DCCH Camping state 106, a mobile periodically measures the signal strength on the current DCCH and all control channels in the neighbor cell list. This measurement process is called the Control Channel Locking procedure, and is executed every SCANINTERVAL. The Control Channel Locking procedure is part of the Control Channel Reselection procedure. The mobile must wait for a delay interval timed by its camping state delay timer 106A, whose maximum delay value is set by the DELAY parameter, before the mobile can begin periodically measuring the signal strength. The DELAY parameter keeps the mobile from considering a neighboring control channel as a reselection candidate until the time delay has been met.

Once the DELAY interval has expired in camping state delay timer 106A, the mobile executes the Control Channel Reselection procedure to find a better control channel from which to obtain service. It typically invokes this procedure from the DCCH Camping state 106 over action path 132. In the Control Channel Locking procedure, the mobile measures and averages the signal strength on the current DCCH and all neighboring control channels. It does this periodically at the measurement interval determined by the value of SCANINTERVAL broadcast on the current DCCH. The period is timed by the camping state scan timer 106B, whose maximum duration value is set by the SCANINTERVAL parameter. The signal strength of the current DCCH is measured every SCANINTERVAL. The signal strength of neighboring control channels is measured either every SCANINTERVAL or every other SCANINTERVAL.

The mobile leaves the DCCH Camping state 106 in FIG. 1 to process transactions such as registration in the Registration Proceeding state 108, call origination in the Origination Proceeding state 112, or received call termination in the waiting for order state 110. A condition that precipitates leaving the DCCH Camping state 106 and returning to the Control Channel Scanning and Locking state 104 is losing service on the current DCCH, such as by a radio link failure on action path 130 and being unable to find another control channel through reselection. For further details, see the IS-136 Digital Cellular/PCS specification, section 6.3.3.4.1. A mobile stays in the DCCH Camping state 106 while it reselects from one DCCH to another.

The mobile transitions along action path 142 in FIG. 1 to the Registration Proceeding state 108 after sending a Registration message on a DCCH or in response to a forced registration request from the base station. Registration is the process whereby a mobile identifies itself to the base station and makes itself available for service. It remains in the Registration Proceeding state 108 for up to sixteen seconds while waiting for a response from the base station to its registration attempt. It returns from this state on path 142' upon expiration of the sixteen second timer indicating that the time to wait has expired.

The mobile transitions along action path 122 in FIG. 1 to the Origination Proceeding state 112 after sending an origination message on a DCCH and while waiting for a response from the base station. The MAX_RETRIES parameter is the access parameter used by the mobile to attempt accessing the base station up to a maximum number of attempts. The MAX_RETRIES parameter sets the maximum retry count in the call origination retry counter 112A. The mobile leaves the Origination Proceeding state 112 when it receives a digital traffic designation from the base station, and moves to the assigned channel along path 124. If the mobile determines that the origination message was not received by the base station, it returns to the DCCH Camping state 106.

The mobile transitions along action path 146 in FIG. 1 to the Waiting For Order state 110 after sending a Page Response message on a DCCH and while waiting for a response from the base station. A page is a message sent by the base station to inform the mobile that a message is waiting, either a voice message, a short message service (SMS) message, or a fax message. The mobile remains in Waiting For Order state 110 for up to 6.4 seconds while waiting for a response from the base station. The mobile leaves the waiting for order state 110 when it receives a digital traffic designation from the base station, and moves to the assigned channel along path 126. It returns from the waiting for order state 110 along path 146' upon expiration of the 6.4 second timer indicating the time has expired to wait between sending a Page Response message and receiving a response from the base station.

The mobile transitions along action path 144 in FIG. 1 to the Shared Secret Data (SSD) Update Proceeding state 114 if it has sent a Confirmation message in response to a Notification message indicating an SSD update. Shared Secret Data (SSD) is a 128-bit pattern stored in the mobile's memory, used to support authentication, voice privacy, and message encryption. It leaves the SSD Update Proceeding state 114 upon expiration of a twelve second timer indicating the time has expired to wait between successfully sending a Confirmation message and receiving a response from the base station.

Overlay Networks

The IS-136 Digital Cellular/PCS system can form hierarchical cell structures such as shown in FIG. 3, to increase the capacity of a cellular system by positioning smaller area adjunct cells or microcells 310 to operate within a system 300 of larger area primary cells or macrocells 301, 302, and 303. Such cells exist in a layered or overlay configuration that enables greater re-use of the RF spectrum and provides continuity of communication between the cell layers. An example is an indoor microcell system 310 operating within an outdoor macrocell system 300.

In an overlay configuration where a microcell wireless system 310 shares the same spectrum as the macrocell system 300 which is the owner of the RF spectrum, it is necessary for the microcell system 310 to monitor the activity of the macrocell system 300 on all RF channels. This involves periodic signal strength measurements that are made both by mobiles 20 and by the base stations 10 in the microcell wireless system 310. The microcell system 310 partitions all of the monitored RF channels into two sets: a first set of channels that are likely to be interference-free and a second set of noisy channels. A list is compiled of the interference-free channels in the first set as a pool of available channels that can be assigned to the microcell base stations and their registered mobiles. In the above-referenced copending U.S. patent application Ser. No. 09/401,408, filed Sep. 22, 1999, to Mathilde Benveniste, entitled "Self-Configurable Wireless Systems: Spectrum Monitoring In A Layered Configuration", a mechanism is discussed to acquire such measurements on downlink channels by the mobiles 20, by deploying the mobiles registered to the microcell system 310.

What is needed is a method for signal strength measurements on uplink channels by the microcell base stations 10. However, the measurement of signal strength on uplink channels by the microcell base stations 10 must deal with a special set of problems when there are relatively few microcell base stations 10 in a region of a registered mobile station 20.

In a region where there is a high-density of microcell base stations 10 available with overlapping coverage, mobiles 20 registered to an idle microcell base station 10 can be induced to register to a neighboring microcell base station while measurements are taken by the idle base station 10. A powered-up mobile 20 registers when it enters the coverage area of a base station 10, or when it is first powered on, and it is placed on the list of registered mobiles. This enables the microcell base station 10 to page it if there is an incoming call. An inactive mobile 20 [i.e., a mobile not engaged in a call] does not need a traffic channel. It is assigned a traffic channel when a call starts.

When a microcell base station 10 is idle (that is, not serving any calls), it can retune to different channels and take measurements of several channels at once, thus offering an efficient mechanism for spectrum monitoring. This can be achieved by disabling the Digital Control Channel (DCCH), thus forcing the registered mobiles 20 to reselect another control channel.

However, in sparse systems where there are relatively few microcell base stations 10 in a region, it is not desirable to cause a registered mobile station 20 to undertake control channel reselection. The capability to stay on the current control channel is desirable for a microcell system 310 because control channel reselection in a sparse system will likely force mobiles 20 to register on the outside, macrocell cellular system 300. Since return to the original control channel is not immediate, a mobile 20 could end up placing a call on the outside, macrocell system 300 while the subscriber thinks he/she is being served by the microcell system 310.

Thus, the prior art is confronted with at least two problems. One is to avoid causing the inactive mobiles registered on the measuring microcell base station to miss their control channel and thus be forced to re-select a macrocell base station. The second problem is to reduce the probability that a call initiated by a mobile during an uplink spectrum-monitoring measurement by a microcell base station, will cause the transfer of the call to a macrocell base station.

SUMMARY OF THE INVENTION

A method and system are disclosed to avoid causing the inactive mobiles registered on a measuring microcell base station to miss their control channel and thus be forced to re-select a macrocell base station. The invention reduces the probability that a call initiated by a mobile during an uplink spectrum-monitoring measurement by a microcell base station, will cause the transfer of the call to a macrocell base station.

The method of the invention begins with the microcell base station determining that there is no traffic with mobile stations in the microcell. Then the microcell base station gets the estimated duration for the next spectrum monitoring measurement session. The actual duration required to complete a spectrum monitoring measurement session is a function of the number channels in active use in both the macrocell system and in the microcell system. This is a function of the diurnal and weekly calling habits and movement patterns of the users. This is also a function of diurnal and weekly solar activity, diurnal interference from out-of-band users, and other environmental factors that vary with time. The aggregate effect of these factors on the availability of interference-free channels manifests itself in the spectrum monitoring measurement. The length of time to carry out the spectrum monitoring measurement is recorded during each measurement session, and this updated value is used as the estimated duration of the next spectrum monitoring measurement session.

Then the microcell base station transmits a digital control channel (DCCH) message to the mobile stations to set the "DELAY" parameter for their camping state delay timers to be greater than the estimated duration value. The mobile must wait for a delay interval set by the DELAY parameter before it can begin periodically measuring the signal strength of other digital control channels. The DELAY parameter keeps the mobile from considering a neighboring digital control channel as a reselection candidate until the time delay has been met. Since the delay is forced by the base station to be longer than the estimated duration of the spectrum monitoring measurement session, the mobile station is effectively prevented from leaving the base station's digital control channel (DCCH). As an alternative, the "DELAY" parameter can be set to its maximum value of 4.5 minutes.

The ability of the base station to prevent the mobile from leaving the DCCH is enhanced by forcibly resetting the mobile station's camping state delay timer to zero. There are three alternate ways to accomplish this.

Then the microcell base station can transmit a page notification in a DCCH message, without a follow up. This will force the mobile out of the camping state for 6.4 secs and reset mobile's camping state delay timer to zero. As an alternate way, the microcell base station can transmit an SSD update notification in a DCCH message. This will force the mobile out of the camping state for 12 secs and reset mobile's camping state delay timer to zero. As a further alternate way, the microcell base station can transmit a forced re-registration request in a DCCH message. This will force the mobile out of the camping state for 16 secs and reset mobile's camping state delay timer to zero.

Then the microcell base station turns off the base station's transmitter. It then retunes the base station's receiver to the frequency to be monitored. It then measures a signal strength on that frequency. It then retunes the receiver back to its assigned frequency. The microcell base station then turns on the transmitter within estimated duration.

Then the microcell base station transmits a DCCH message to the mobile stations to reset the "DELAY" parameter for their camping state delay timers to be normal duration value.

Finally, the microcell base station updates the estimated duration for spectrum monitoring measurements. The microcell base station then returns to the first step to wait until another interval occurs when there is no traffic with mobile stations in the microcell.

In an alternate embodiment of the invention, the microcell base station transmits a digital control channel (DCCH) message to the mobile stations to set the "SCANINTERVAL" parameter for their camping state scan timers to be greater than the estimated duration value. Once the DELAY interval has expired, the mobile begins the periodic scanning of other DCCHs to find a better control channel from which to obtain service. The mobile periodically measures and averages the signal strength on the current DCCH and all neighboring control channels. It does this after the periodic measurement interval determined by the value of SCANINTERVAL. Since the periodic scanning is forced by the base station to begin after SCANINTERVAL, which is longer than the estimated duration of the spectrum monitoring measurement session, the mobile station is effectively prevented from leaving the base station's digital control channel (DCCH). When the spectrum monitoring measurements are completed, the microcell base station transmits a DCCH message to the mobile stations to reset the "SCANINTERVAL" parameter for their camping state scan timers to be normal duration value. As an alternative, the "SCANINTERVAL" parameter can be set to its maximum value of 20.5 seconds.

In a further alternate embodiment of the invention, the microcell base station transmits a digital control channel (DCCH) message to the mobile stations to set the "MAX_RETRIES" parameter for their call origination retry counters to count for longer than the estimated duration. The MAX_RETRIES parameter is the access parameter used by the mobile to attempt accessing the base station up to a maximum number of attempts. If the user of the mobile were to originate a call during the spectrum monitoring measurement session, the mobile will need the use of the DCCH to set up the call with the base station. By forcing the MAX_RETRIES parameter to be large, the mobile will repeatedly go through the process of retrying to access the DCCH so as to take longer than the estimated duration for the spectrum monitoring measurement session. When the spectrum monitoring measurements are completed, the microcell base station transmits a DCCH message to the mobile stations to reset the "MAX_RETRIES" parameter for their call origination retry counters to be normal count value. As an alternative, the "MAX_RETRIES" parameter can be set to its maximum value of 7 retries.

The resulting invention avoids causing inactive mobiles registered on a measuring microcell base station to miss their control channel and thus be forced to re-select a macrocell base station.

DESCRIPTION OF THE FIGURES

FIG. 4 illustrates the state diagram for the operation of a wireless mobile device in accordance with the invention.

FIG. 5A is a diagram of IS-136 frames carrying forward digital control channel (DCCH) containing messages to set timer and counter values to maximum in the mobile device, in accordance with the invention.

FIG. 5B is a diagram of IS-136 frames carrying forward digital control channel (DCCH) containing messages to reset Camping state delay timer to zero in the mobile device, in accordance with the invention.

FIG. 6A is a flow diagram of the sequence of operational steps for a microcell base station transmitting a large value for the "DELAY" parameter to assist in making uplink spectrum monitoring measurements, in accordance with the invention.

FIG. 6B is a flow diagram of the sequence of operational steps for a microcell base station transmitting a large value for the "SCANINTERVAL" parameter to assist in making uplink spectrum monitoring measurements, in accordance with the invention.

FIG. 6C is a flow diagram of the sequence of operational steps for a microcell base station transmitting a large value for the "MAX_RETRIES" parameter to assist in making uplink spectrum monitoring measurements, in accordance with the invention.

FIG. 6D is a flow diagram of the sequence of operational steps for a microcell base station transmitting large values for both the "DELAY" parameter and the "MAX_RETRIES" parameter to assist in making uplink spectrum monitoring measurements, in accordance with the invention.

FIG. 6E is a flow diagram of the sequence of operational steps for a microcell base station transmitting large values for both the "SCANINTERVAL" parameter and the "MAX_RETRIES" parameter to assist in making uplink spectrum monitoring measurements, in accordance with the invention.

DISCUSSION OF THE PREFERRED EMBODIMENT

Figure 1:
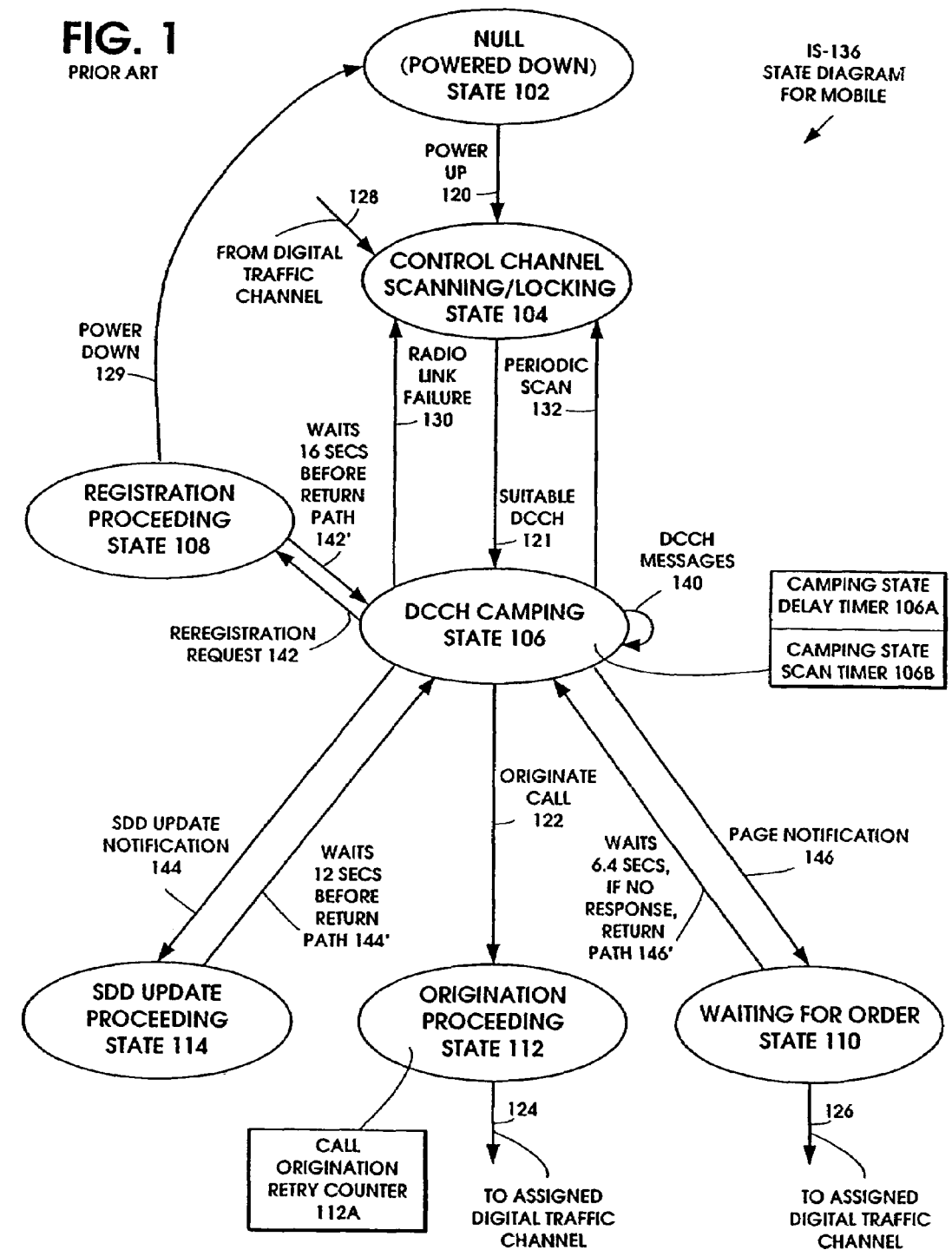
FIG. 1 is a prior art state diagram for the operation of a wireless mobile device which is compliant with the IS-136 standard.

The operation of a wireless mobile device 20 which is registered to a microcell base station 10 is controlled by the base station as shown in the state diagram of FIG. 4, in accordance with the invention. The various states depicted in FIG. 4 are the same as those described for FIG. 1, but the particular control inputs to the states and the application of the responses by the states are modified, in accordance with the invention. The microcell base station 10, transmits digital control channel (DCCH) inputs 140' to the mobile 20 which prevent the mobile 20 from reselecting a control channel while microcell base station 10 does uplink monitoring.

Figure 2:
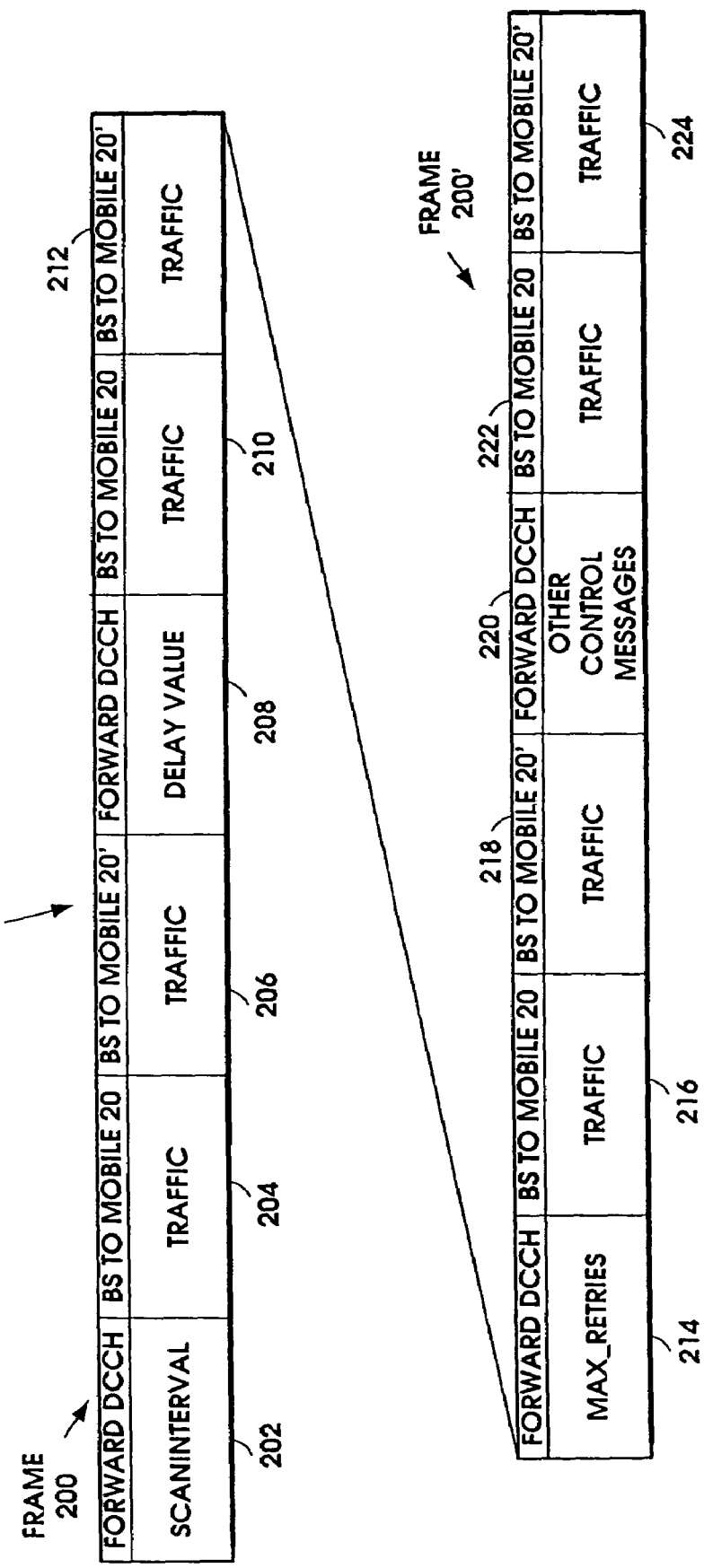
FIG. 2 is a prior art diagram of IS-136 frames carrying a forward digital control channel (DCCH) containing control channel selection and access parameters.
Figure 3:
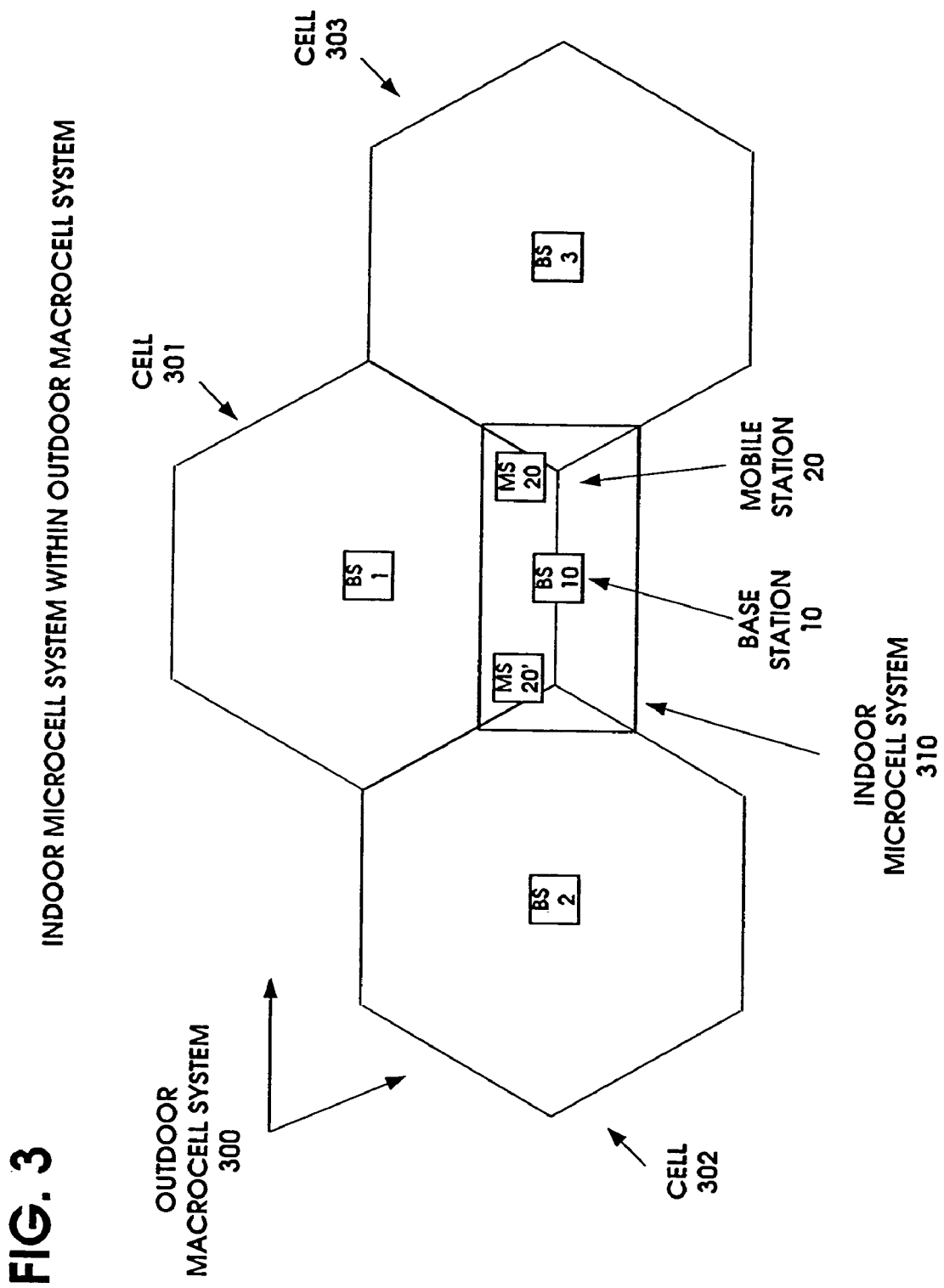
FIG. 3 shows a system diagram of an indoor microcell wireless system within a an outdoor macrocell system, in accordance with the invention.

FIG. 5A is a diagram of IS-136 frames carrying forward digital control channel (DCCH) containing messages to set timer and counter values to large values in the mobile device, in accordance with the invention. The frame 200A shown in FIG. 5A contains control channel selection parameters for a larger SCANINTERVAL value in time slot 202A and a larger DELAY VALUE in time slot 208A. Time slots 204 and 210 carry traffic from the base station (BS) to a first mobile 20 and time slots 206 and 212 carry traffic from the base station (BS) to a second mobile 20'. The frame 200A shown in FIG. 2 carries the forward digital control channel (DCCH) containing a larger value for the access parameter MAX_RETRIES in time slot 214A. Time slots 216 and 222 carry traffic from the base station (BS) to mobile 20 and time slots 218 and 224 carry traffic from the base station (BS) to mobile 20'. Time slot 220 carries other forward digital control channel (DCCH) broadcast channel messages or point-to-point control channel messages.

The microcell base station 10 transmits a digital control channel (DCCH) message 208A in FIG. 5A to the mobile stations 20 to set the "DELAY" parameter for their camping state delay timers 106A to be greater than the estimated duration value. The mobile must wait for a delay interval set by the DELAY parameter before it can begin action path 132 of FIG. 4, to periodically measure the signal strength of other digital control channels. The DELAY parameter keeps the mobile 20 from considering a neighboring digital control channel as a reselection candidate until the time delay has been met. Since the delay is forced by the base station 10 to be longer than the estimated duration of the spectrum monitoring measurement session, the mobile station 20 is effectively prevented from leaving the base station's digital control channel (DCCH). When the spectrum monitoring measurements are completed, the microcell base station transmits a DCCH message to the mobile stations to reset the "DELAY" parameter for their camping state delay timers 106A to be normal duration value. As an alternative, the "DELAY" parameter can be set to its maximum value of 4.5 minutes.

The microcell base station 10 transmits a digital control channel (DCCH) message 202A in FIG. 5A to the mobile stations 20 to set the "SCANINTERVAL" parameter for their camping state scan timers 106B to be greater than the estimated duration value. Once the DELAY interval has expired, the mobile 20 can start the scan timer 106B to periodically scan other DCCHs to find a better control channel from which to obtain service. The mobile 20 periodically measures and averages the signal strength on the current DCCH and all neighboring control channels. It begins action path 132 of FIG. 4, after the periodic measurement interval determined by the value of SCANINTERVAL. Since the periodic scanning is forced by the base station 10 to begin after SCANINTERVAL, which is longer than the estimated duration of the spectrum monitoring measurement session, the mobile station 20 is effectively prevented from leaving the base station's digital control channel (DCCH). When the spectrum monitoring measurements are completed, the microcell base station transmits a DCCH message to the mobile stations to reset the "SCANINTERVAL" parameter for their camping state scan timers 106B to be normal duration value. As an alternative, the "SCANINTERVAL" parameter can be set to its maximum value of 20.5 seconds.

The microcell base station 10 transmits a digital control channel (DCCH) message 214A in FIG. 5A to the mobile stations 20 to set the "MAX_RETRIES" parameter for their call origination retry counters 112A to count for longer than the estimated duration. The MAX_RETRIES parameter is the access parameter used by the mobile 20 to attempt accessing the base station 10 up to a maximum number of attempts. If the user of the mobile 20 were to originate a call during the spectrum monitoring measurement session, the mobile 20 will need the use of the DCCH to set up the call with the base station 10. By forcing the MAX_RETRIES parameter to be large, the mobile 20 will repeatedly go through the process of retrying to access the DCCH so as to take longer than the estimated duration for the spectrum monitoring measurement session. When the spectrum monitoring measurements are completed, the microcell base station 10 transmits a DCCH message to the mobile stations 20 to reset the "MAX_RETRIES" parameter for their call origination retry counters 112A to be normal count value. As an alternative, the "MAX_RETRIES" parameter can be set to its maximum value of 7 retries.

The ability of the base station 10 to prevent the mobile 20 from leaving the DCCH is enhanced by forcibly resetting the mobile station's camping state delay timer 106A to zero. There are three alternate ways to accomplish this, as shown in FIG. 4. The IS-136 frame in FIG. 5B, carries a forward digital control channel (DCCH) containing messages to reset Camping state delay timer to zero in the mobile device, in accordance with the invention. The microcell base station 10 can transmit a page notification 146B in a DCCH message 240 of FIG. 5B, without a follow up. This will force the mobile 20 out of the camping state 106 for 6.4 secs as shown in FIG. 4, and will reset mobile's camping state delay timer 106A to zero.

As an alternate way, the microcell base station 10 can transmit an SSD update notification 144B in a DCCH message 240 of FIG. 5B. This will force the mobile 20 out of the camping state 106 for 12 secs as shown in FIG. 4, and will reset mobile's camping state delay timer 106A to zero.

As a further alternate way, the microcell base station 10 can transmit a forced re-registration request 142B in a DCCH message 240 of FIG. 5B. This will force the mobile 20 out of the camping state 106 for 16 secs as shown in FIG. 4, and will reset mobile's camping state delay timer 106A to zero.

The IS-136 frame in FIG. 5B, has other time slots 236 and 242 that carry traffic from the base station (BS) to mobile 20 and time slots 238 and 244 that carry traffic from the base station (BS) to mobile 20'. Time slot 234 carries other forward digital control channel (DCCH) broadcast channel messages or point-to-point control channel messages.

FIG. 6A is a flow diagram of the method 600A which is a sequence of operational steps for a microcell base station transmitting a large value for the "DELAY" parameter to assist in making uplink spectrum monitoring measurements, in accordance with the invention. The first step 602 is for the microcell base station to determine that there is no traffic with mobile stations in the microcell.

Then in step 604, the microcell base station gets the estimated duration for the next spectrum monitoring measurement session. The actual duration required to complete a spectrum monitoring measurement session is a function of the number channels in active use in both the macrocell system and in the microcell system. This is a function of the diurnal and weekly calling habits and movement patterns of the users. This is also a function of diurnal and weekly solar activity, diurnal interference from out-of-band users, and other environmental factors that vary with time. The aggregate effect of these factors on the availability of interference-free channels results in the spectrum monitoring measurement. The length of time to carry out the spectrum monitoring measurement is recorded during each measurement session, and is used as the estimated duration of the next spectrum monitoring measurement session.

Then in step 606A, the microcell base station transmits a digital control channel (DCCH) message 208a to the mobile stations to set the "DELAY" parameter for their camping state delay timers to be greater than the estimated duration value. The mobile must wait for a delay interval set by the DELAY parameter before it can begin periodically measuring the signal strength of other digital control channels. The DELAY parameter keeps the mobile from considering a neighboring digital control channel as a reselection candidate until the time delay has been met. Since the delay is forced by the base station to be longer than the estimated duration of the spectrum monitoring measurement session, the mobile station is effectively prevented from leaving the base station's digital control channel (DCCH). As an alternative, the "DELAY" parameter can be set to its maximum value of 4.5 minutes.

The ability of the base station to prevent the mobile from leaving the DCCH is enhanced by forcibly resetting the mobile station's camping state delay timer to zero. There are three alternate ways to accomplish this, each having a different time away from the camping state 106, the three ways being selected by step 608.

In step 610, the microcell base station can transmit a page notification in a DCCH message 146b, without a follow up. This will force the mobile out of the camping state for 6.4 secs and reset mobile's camping state delay timer to zero.

In step 612, as an alternate way, the microcell base station can transmit an SSD update notification in a DCCH message 144b. This will force the mobile out of the camping state for 12 secs and reset mobile's camping state delay timer to zero.

In step 614, as a further alternate way, the microcell base station can transmit a forced re-registration request in a DCCH message 142b. This will force the mobile out of the camping state for 16 secs and reset mobile's camping state delay timer to zero.

In step 616, the microcell base station turns off the base station's transmitter.

In step 618, the microcell base station then retunes the base station's receiver to the frequency to be monitored.

In step 620, the microcell base station then measures a signal strength on that frequency.

In step 622, the microcell base station then retunes the receiver back to its assigned frequency.

In step 624, the microcell base station then turns on the transmitter within estimated duration.

In step 626A, the microcell base station transmits a DCCH message to the mobile stations to reset the "DELAY" parameter for their camping state delay timers to be normal duration value.

Finally, In step 628, the microcell base station updates the estimated duration for spectrum monitoring measurements. The microcell base station then returns to the first step 602 to wait until another interval occurs when there is no traffic with mobile stations in the microcell.

In an alternate embodiment of the invention shown in the method 600B of FIG. 6B, the microcell base station transmits a digital control channel (DCCH) message 202A in step 606B to the mobile stations to set the "SCANINTERVAL" parameter for their camping state scan timers to be greater than the estimated duration value. Once the DELAY interval has expired, the mobile begins the periodic scanning of other DCCHs to find a better control channel from which to obtain service. The mobile periodically measures and averages the signal strength on the current DCCH and all neighboring control channels. It does this after the periodic measurement interval determined by the value of SCANINTERVAL. Since the periodic scanning is forced by the base station to begin after SCANINTERVAL, which is longer than the estimated duration of the spectrum monitoring measurement session, the mobile station is effectively prevented from leaving the base station's digital control channel (DCCH). When the spectrum monitoring measurements are completed, the microcell base station transmits a DCCH message to the mobile stations in step 626B to reset the "SCANINTERVAL" parameter for their camping state scan timers to be normal duration value. As an alternative, the "SCANINTERVAL" parameter can be set to its maximum value of 20.5 seconds. In FIG. 6B, the steps 602, 604, 608 to 624, and 628 are the same as those described for FIG. 6A.

In a further alternate embodiment of the invention shown in the method 600C of FIG. 6C, the microcell base station transmits a digital control channel (DCCH) message 214A in step 606C to the mobile stations to set the "MAX_RETRIES" parameter for their call origination retry counters to count for longer than the estimated duration. The MAX_RETRIES parameter is the access parameter used by the mobile to attempt accessing the base station up to a maximum number of attempts. If the user of the mobile were to originate a call during the spectrum monitoring measurement session, the mobile will need the use of the DCCH to set up the call with the base station. By forcing the MAX_RETRIES parameter to be large, the mobile will repeatedly go through the process of retrying to access the DCCH so as to take longer than the estimated duration for the spectrum monitoring measurement session. When the spectrum monitoring measurements are completed, the microcell base station transmits a DCCH message in step 626C to the mobile stations to reset the "MAX_RETRIES" parameter for their call origination retry counters to be normal duration value. As an alternative, the "MAX_RETRIES" parameter can be set to its maximum value of 7 retries. In FIG. 6C, the steps 602, 604, 608 to 624, and 628 are the same as those described for FIG. 6A.

FIG. 6D is a flow diagram of the sequence of operational steps for a microcell base station transmitting large values for both the "DELAY" parameter in step 606A and the "MAX_RETRIES" parameter in step 606C to assist in making uplink spectrum monitoring measurements, in accordance with the invention. Steps 626A and 626C reset these parameters to their normal values when the spectrum monitoring measurements are completed. In FIG. 6D, the steps 602, 604, 608 to 624, and 628 are the same as those described for FIG. 6A.

FIG. 6E is a flow diagram of the sequence of operational steps for a microcell base station transmitting large values for both the "SCANINTERVAL" parameter in step 606B and the "MAX_RETRIES" parameter in step 606C to assist in making uplink spectrum monitoring measurements, in accordance with the invention. Steps 626B and 626C reset these parameters to their normal values when the spectrum monitoring measurements are completed. In FIG. 6E, the steps 602, 604, 608 to 624, and 628 are the same as those described for FIG. 6A.

DETAILED DISCUSSION OF THE INVENTION

1. Control Channel Re-Selection During Spectrum Monitoring

A Spectrum Monitoring measurement on an arbitrary frequency involves the following steps, as shown in FIG. 6A:

(1) Step 616: the transmitter is turned off;
(2) Step 618: the receiver/transmitter is tuned to the frequency to be measured, and a timer is set to allow sufficient time for the retuning operation to complete;
(3) Step 620: once the timer expires, the measurement is made;
(4) Step 622: once the measurement is completed, the receiver/transmitter is tuned back to the original control frequency and a timer is set to allow sufficient time for the retuning operation to complete; and
(5) Step 624: once the timer expires, the transmitter is turned back on. The above steps are collectively referred to as the "measurement procedure".

If the duration of the above measurement procedure is sufficiently long, control channel re-selection in the base station system could be triggered by two conditions: Radio Link Failure and Periodic Scanning. (For further details, see the IS-136 Digital Cellular/PCS specification, section 6.3.3.4.1.) The first condition is of less concern than the second, because it takes longer to trigger re-selection. The first condition takes 10 hyper-frames (12.8 secs) to trigger. (For further details, see the IS-136 Digital Cellular/PCS specification, section 5.5.1.) The second condition triggers re-selection after a time interval that is less than or equal to the parameter SCANINTERVAL, which is the measurement interval between periodic signal-strength measurements. Provided that the measurement procedure takes less than 12.8 secs, the first condition is never met. But there is always some likelihood that the second condition will be met and, thus, cause a registered mobile to select a new control channel.

The probability of control-channel re-selection is related to the duration of the measurement procedure and the time interval SCANINTERVAL. A registered mobile will re-select its control channel when its control channel vanishes, provided it has camped on its current control channel for a time interval equal to the value of the parameter DELAY, which may be set at a maximum value of 420 super-frames (4.5 min). (For further details, see the IS-136 Digital Cellular/PCS specification, section 6.5.) Hence, once the mobile has camped on a control channel for more than 4.5 min, the probability of control-channel reselection is equal to $$Pr[\text{resel}] = \text{measurement\_length}/\text{SCANINTERVAL} \quad \text{Equation (1)}$$

To reduce the likelihood that the second condition will be met, the parameter SCANINTERVAL can be set to the maximum value allowed, which is 16 hyper-frames (20.5 secs). (For further details, see the IS-136 Digital Cellular/PCS specification, section 6.5.)

It has been estimated that the measurement, including retuning, that is, steps 618 through the start of step 624, takes less than 600 ms. This estimate has been confirmed empirically by recording the base station clock time at every step of the measurement procedure. Thus, when the measurement length is 600 ms, the re-selection probability will be 3 percent.

2. Time Off The Control Channel

A mobile that has re-selected control channel during a spectrum monitoring measurement will not return to its previous control channel immediately after the transmitter of the measuring base station is turned back on. There will be a delay that will depend on the parameters in the system of the new control channel.

Experiments have been conducted that caused a mobile registered to a base station to re-select a control channel during a spectrum monitoring measurement, and found that the control channel re-selected belongs to the macrocell system outside. It is expected that the outside macrocell system will be selected when the base station system is sparse. The time was recorded when the mobile monitor displays a new control channel, and found that it takes approximately 15 secs for a mobile that has re-selected control channel to return to its original control channel, even if the original control channel is available sooner.

3. Preventing Control Channel Re-Selection

For systems employing the IS 136 Standard, the possibility of channel re-selection during uplink spectrum monitoring is eliminated altogether by having the microcell base station 10 reset the mobile station's camping state delay timer 106A (DELAY_TMR) for starting periodic scanning in the Camping state 106. A registered mobile 20 will re-select a control channel when its current control channel vanishes, provided it has camped on its current control channel for a time interval equal to the value of the parameter DELAY. Setting the value of DELAY equal to 420 super-frames (4.5 min) suspends the periodic scanning for a period of 4.5 minutes.

The mobile station's camping state delay timer 106A (DELAY_TMR) is reset by forcing the mobile 20 to leave the Camping state 106 temporarily. There are several ways to so. Among them are:

1. Send a page notification to a mobile without follow up. (For further details, see the IS-136 Digital Cellular/PCS specification, section 6.2.6).
2. Send an SSD update notification to the mobile. (For further details, see the IS-136 Digital Cellular/PCS specification, section 6.2.8.)
3. Send a forced re-registration request to the mobile in an audit order. (For further details, see the IS-136 Digital Cellular/PCS specification, section 6.3.7.)

When a page notification is sent to the mobile, for instance, the mobile will enter the Waiting-for-Order state 110 and, after waiting for an interval of 6.4 seconds it will return to the Camping state. The mobile station's camping state delay timer 106A (DELAY_TMR) will be re-initialized at this point. If the DELAY parameter is set to a value greater than the spectrum-monitoring measurement duration, the periodic scanning will not occur during the measurement. This will allow the system to make spectrum monitoring measurements without ever re-selecting the control channel.

The advantage of the page notification approach over the SSD update and the forced re-registration approaches, is that the page notification approach takes 6.4 sees, as compared to 12 seconds needed for the SSD update approach and 16 secs needed for re-registration approach. It is important to keep the duration of all operations as short as possible because of the impact on the sample spacing, i.e., the time between consecutive measurements on the same channel. Maintaining appropriate sample spacing maximizes the system's ability to quickly and accurately respond to interference changes.

4. Call Transfer Probability During Spectrum Monitoring

While a microcell base station 10 is monitoring the RF channels and updating its list of available interference-free channels, its control channel is inactive for a short time interval. To find its assigned control channel, a mobile station 20 initiating a call is allowed a quantity of Max Retries+1 attempts. (For further details, see the IS-136 Digital Cellular/PCS specification, section 5.3.3.1.) If unsuccessful, the mobile will re-select a control channel, thus causing the call to be transferred to, and routed through, the nearest alternate base station.

The probability of call transfer is related to the number of access retries allowed. Hence, in order to minimize the call transfer probability, the Max Retries is set equal to the maximum value allowed, which is equal to 7. The call transfer probability will depend on the measurement duration as it affects both the probability that a call will be started during the measurement, and the probability that the number of access retries allowed will expire before the DCCH becomes available again. It has been calculated that, for an offered load of 0.381 Erlangs, for instance, the call transfer probability is less than 0.0000058 if the measurement duration is 0.6 sec. That is, on the average, one out of at least 172,000 measurements would cause a call to be transferred. It is concluded therefore that the probability of forcing a call transfer to another base station during an uplink spectrum monitoring measurement is negligible, when using the invention.

Various illustrative examples of the invention have been described in detail. In addition, however, many modifications and changes can be made to these examples without departing from the nature and spirit of the invention.

What is claimed is:

1. A system for performing spectrum monitoring measurements by a microcell base station in a layered cellular network that includes macrocell and microcell wireless systems, comprising:

transmitting means transmitting a control message from a microcell base station to a microcell mobile station, to delay reselecting another control channel by the microcell mobile station;

turn off means turning off the microcell base station's transmitter while not serving calls or engaged in processing calls of mobile stations; comprising:

first retuning means retuning the microcell base station's receiver to a frequency to be monitored;

measuring means measuring a signal strength on said frequency;

second retuning means retuning the receiver back to its assigned frequency, and turn on means turning on the transmitter;

whereby spectrum-monitoring measurements are made without impacting the service provided by the microcell wireless system.

2. A system for performing spectrum monitoring measurements by a microcell base station in a layered cellular network that includes macrocell and microcell wireless systems, comprising:

transmitting means transmitting a control message from a microcell base station to a microcell mobile station, to increase a duration for the mobile station to reside in a camping state on a control channel of the microcell mobile station;

turn off means turning off the microcell base station's transmitter while not serving calls or engaged in processing calls of mobile stations;

first retuning means retuning the microcell base station's receiver to a frequency to be monitored;

measuring means measuring a signal strength on that frequency;

second retuning means retuning the receiver back to its assigned frequency, and turn on means turning on the transmitter;

whereby spectrum-monitoring measurements are made without causing inactive mobile stations registered on the microcell base station to reselect another control channel.

3. The system of claim 2 wherein said control message set a camping state delay timer to have a delay duration not less than an estimated measurement duration.

4. The system of claim 3 wherein:

said transmitting means transmits a second control message from the microcell base station to the microcell mobile station, to reset said camping state delay timer, to begin said delay duration before reselecting another control channel;

said delay duration causing periodic scanning of another control channel to be suspended for at least the desired measurement duration by forcing the mobile station temporarily out of the camping state.

5. The system of claim 4 wherein said second control message is a page notification to the mobile station, without follow up, said page notification forcing the mobile station out of the camping state temporarily.

6. The system of claim 4 wherein said second control message is an SSD update notification to the mobile station, the SSD update notification forcing the mobile station out of the camping state temporarily.

7. The system of claim 4 wherein said second control message is a forced re-registration request to the mobile station;

said forced re-registration request forcing the mobile station out of the camping state temporarily.

8. The system of claim 3 further comprising:

updating means updating said estimated measurement duration;

said transmitting means transmitting a subsequent control message, to set the delay duration for the mobile station to reside in the camping state to be not less than said updated estimated measurement duration; and performing means performing a subsequent spectrum monitoring measurement.

9. The system of claim 2 wherein said control message sets a camping state scan timer to have a scan period duration SCANINTERVAL not less than an estimated measurement duration.

10. The system of claim 9 wherein the SCAN INTERVAL has a value set to a maximum value in order to minimize a probability that a new call by the mobile station will be set up on a cell in the macrocell system following reselection of another control channel.

11. The system of claim 10 wherein said transmitting means transmits a second control message from the microcell base station to the microcell mobile station, to reset said camping state scan timer to begin said scan period before reselecting another control channel;

said begin said scan period causing periodic scanning of another control channel to be suspended for at least the value of SCANINTERVAL by forcing the mobile station temporarily out of the camping state.

12. A system for performing spectrum monitoring measurements by a microcell base station in a layered cellular network that includes macrocell and microcell wireless systems, comprising:

transmitting means transmitting a control message from a microcell base station to a microcell mobile station, to increase a duration for the mobile station to reside in a call origination state while attempting to access a control channel of the microcell base station;

turn off means turning off the microcell base station's transmitter while not serving calls or engaged in processing calls of mobile stations;

first retuning means retuning the microcell base station's receiver to a frequency to be monitored;

measuring means measuring a signal strength on that frequency;

second retuning means retuning the receiver back to its assigned frequency, and turn on means turning on the transmitter;

whereby spectrum-monitoring measurements are made without causing inactive mobile stations registered on the microcell base station to reselect another control channel.

13. The system of claim 12 wherein said control message sets a Max Retries maximum number of attempts to access a control channel to be a maximum value in order to minimize a probability that a new call by the mobile station will be set up on a cell in the macrocell system following reselection of another control channel.

14. A computer readable medium encoded with a computer program, executable in a computer system, for performing spectrum monitoring measurements by a microcell base station in a layered cellular network that includes macrocell and microcell wireless systems, the computer readable medium comprising:

program code for transmitting a control message from the microcell base station to a microcell mobile station, to delay reselecting another control channel;

program code for turning off the microcell base station's transmitter while not serving calls or engaged in processing calls of mobile stations; comprising:

program code for retuning the microcell base station's receiver to a frequency to be monitored;

program code for measuring a signal strength on that frequency;

program code for retuning the receiver back to its assigned frequency, and program code for turning on the transmitter;

whereby spectrum-monitoring measurements are made without impacting the service provided by the microcell system.

15. A computer readable medium encoded with a computer program, executable in a computer system, for performing spectrum monitoring measurements by a microcell base station in a layered cellular network that includes macrocell and microcell wireless systems, the computer readable medium comprising:
program code for transmitting a control message from the microcell base station to a microcell mobile station, to increase a duration for the mobile station to reside in a camping state on a control channel of the microcell base station;
program code for turning off the microcell base station's transmitter while not serving calls or engaged in processing calls of mobile stations;
program code for retuning the microcell base station's receiver to a frequency to be monitored;
program code for measuring a signal strength on that frequency;
program code for retuning the receiver back to its assigned frequency, and
program code for turning on the transmitter;
whereby spectrum-monitoring measurements are made without causing inactive mobile stations registered on the microcell base station to reselect another control channel.

16. The computer readable medium of claim 15 further comprises:
program code for setting with said control message, a camping state delay timer to have a delay duration not less than an estimated measurement duration.

17. The computer readable medium of claim 16 further comprises:
program code for transmitting a second control message from the microcell base station to the microcell mobile station, to reset said camping state delay timer, to begin said delay duration before reselecting another control channel;
said delay duration causing periodic scanning of another control channel to be suspended for at least the desired measurement duration by forcing the mobile station temporarily out of the camping state.

18. The computer readable medium of claim 17 wherein said second control message being a page notification to the mobile station, without follow up,
said page notification forcing the mobile station out of the camping state temporarily.

19. The computer readable medium of claim 17 wherein said second control message being an SSD update notification to the mobile station,
said SSD update notification forcing the mobile station out of the camping state temporarily.

20. The computer readable medium of claim 17 wherein said second control message being a forced re-registration request to the mobile station;
said forced re-registration request forcing the mobile station out of the camping state temporarily.

21. The computer readable medium of claim 16 further comprises:
program code for updating said estimated measurement duration;
program code for transmitting a subsequent control message, to set the delay duration for the mobile station to reside in the camping state to be not less than said updated estimated measurement duration; and
program code for performing a subsequent spectrum monitoring measurement.

22. The computer readable medium of claim 21 further comprises:
program code for setting with said control message, a camping state scan timer to have a scan period duration SCANINTERVAL not less than an estimated measurement duration.

23. The computer readable medium of claim 22 further comprising:
program code for setting the value of SCANINTERVAL to a maximum value in order to minimize a probability that a new call by the mobile station will be set up on a cell in the macrocell system following reselection of another control channel.

24. The computer readable medium of claim 21 further comprises:
program code for transmitting a second control message from the microcell base station to the microcell mobile station, to reset said camping state scan timer to begin said scan period before reselecting another control channel;
said beginning said scan period causing periodic scanning of another control channel to be suspended for at least the value of SCANINTERVAL by forcing the mobile station temporarily out of the camping state.

25. A computer readable medium encoded with a computer program, executable in a computer system, for performing spectrum monitoring measurements by a microcell base station in a layered cellular network that includes macrocell and microcell wireless systems, the computer readable medium comprising:
program code for transmitting a control message from the microcell base station to a microcell mobile station, to increase a duration for the mobile station to reside in a call origination state while attempting to access a control channel of the microcell mobile station;
program code for turning off the microcell base station's transmitter while not serving calls or engaged in processing calls of mobile stations;
program code for retuning the microcell base station's receiver to a frequency to be monitored;
program code for measuring a signal strength on that frequency;
program code for retuning the receiver back to its assigned frequency, and
program code for turning on the transmitter;
whereby spectrum-monitoring measurements are made without causing inactive mobile stations registered on the microcell base station to reselect another control channel.

26. The computer readable medium of claim 25 further comprises:
program code for setting with said control message a Max Retries maximum number of attempts to access a control channel to be a maximum value in order to minimize a probability that a new call by the mobile station will be set up on a cell in the macrocell system following reselection of another control channel.

27. A microcell base station performing spectrum monitoring in a layered cellular network including macrocells and microcells serving mobile stations, comprising:
determining means determining the absence of traffic with mobile stations in a microcell;
measuring means measuring and providing a duration value of an estimated spectrum monitoring measurement;

a transmitter transmitting a message on a digital control channel (DCCH) to the mobile stations to set a delay parameter for the mobile station camping state delay timers to be greater than the duration value; and a selector selecting a mobile station time away from a camping state to enable spectrum monitoring measurements to be made by the microcell base station without causing inactive mobile stations registered on the microcell base station to reselect another control channel.

28. The microcell base station of claim 27 further comprising:

retuning means retuning a microcell base station receiver to a frequency to be monitored and measured with return to the frequency, after the measurement;

resetting means responsive to the message and directing the mobile stations to reset the delay parameter for their camping state delay timers to a normal duration value whereby spectrum-monitoring measurements are made without causing inactive mobile stations registered on the microcell base station to reselect another control channel.

29. The microcell base station of claim 27 wherein a page notification is included in the message without a follow up to force the mobile station out of the camping state and reset a mobile station camping state delay timer to zero.

30. The microcell base station of claim 27 wherein a SSD update notification is included in the message to force the mobile station out of the camping state and reset the mobile station camping state delay timer to zero.

31. The microcell base station of claim 27 wherein a forced re-registration request is included in the message to force the mobile station out of the camping state and reset the mobile station camping delay timers to zero.

32. The microcell base station of claim 27 further comprising:

updating means updating said estimated measurement duration;

said transmitter transmitting a subsequent control message, to set the delay duration for the mobile station to reside in the camping state to be not less than said updated estimated measurement duration; and performing means performing a subsequent spectrum monitoring measurement.

33. A method in a mobile station to enable spectrum monitoring measurements by a microcell base station in a layered cellular network that includes macrocell and microcell wireless systems, comprising:

receiving at the mobile station a first control message from a microcell base station to increase a duration value for the mobile station to reside in a camping state on a control channel of the microcell base station:

starting a delay timer in the mobile station for the increased duration value; and receiving a second control message at the mobile station to reset the delay timer to a normal value whereby spectrum-monitoring measurements are made without impacting the service provided by the microcell wireless system.

* * * * *